Figure 1:
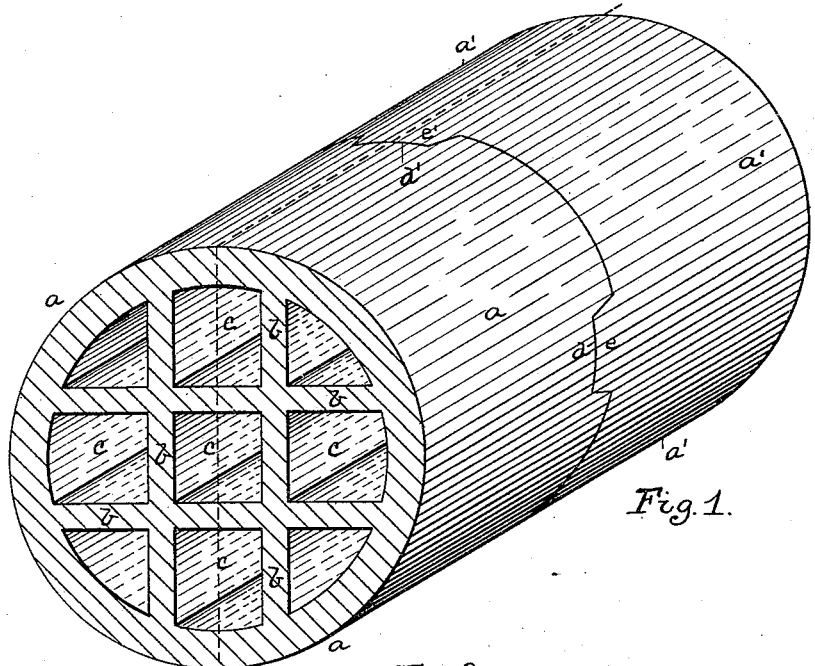

(No Model.)

C. A. FREEMAN.
CONDUIT FOR ELECTRIC WIRES.

No. 470,237. Patented Mar. 8, 1892.

Witnesses:
J. N. Cooke
Helen Martin

Inventor:
Charles A. Freeman
By Robt. D. Totten
James T. Hay
Attorneys

UNITED STATES PATENT OFFICE.

CHARLES A. FREEMAN, OF STEUBENVILLE, OHIO.

CONDUIT FOR ELECTRIC WIRES.

SPECIFICATION forming part of Letters Patent No. 470,237, dated March 8, 1892.

Application filed September 25, 1891. Serial No. 406,805. (No model.)

*To all whom it may concern:*

Be it known that I, CHARLES A. FREEMAN, a resident of Steubenville, in the county of Jefferson and State of Ohio, have invented a new and useful Improvement in Conduits for Electric Wires; and I do hereby declare the following to be a full, clear, and exact description thereof.

My invention relates to underground conduits for carrying electric wires. It is a generally-established law in almost all large cities that the wires for the distribution of electricity—such as electric-light and telephone wires—should be carried in conduits buried under ground for purposes of safety, as well as to dispense with the use of the unsightly poles. The best adapted and cheapest form of conduit for such purposes, as proven by experience, has been found to be a conduit constructed of fire-clay properly burned. In order to separate the several wires carried in the conduit and to prevent confusion due to the crossing of the wires, these conduits are generally formed with two or more compartments therein, each compartment carrying one or more wires, according to the size of said compartments. The conduits, whether rectangular or circular in form, are constructed in sections of a few feet in length, and in the laying of the line it is of the utmost importance that the ends of the several sections composing the line exactly coincide—that is, that all the sections be in perfect alignment with each other. Not only must there be a perfect coincidence of the ends of the conduits, but the several longitudinal partition-walls must exactly coincide in order that the compartments of one section will correspond exactly with the compartments of the succeeding section, and so on throughout the line, to form continuous and even passages therein. It is customary in the construction of a line made up of conduits of this nature to first construct the line for quite a distance with the several sections in alignment with each other, and then to draw the wires through and arrange them in their allotted compartments, after which another section of the line is laid and the wires accordingly drawn through it, as in the preceding one. If this course is not followed, certain power-propelled carriers are passed through the tubes and carry cords by which the wires may be drawn through the tubes. Unless the compartments of the several sections exactly coincide it will be a matter of considerable difficulty and inconvenience to cause the carriers to travel through or to drag the wires through the compartments where there is an unevenness due to the non-coincidence of the walls of the different compartments, as oftentimes the wires are very heavy. To produce this result, it is necessary that there be some means of guiding the sections into position, so as to bring not only the ends of the exterior walls of the conduits into coincidence, but also the ends of the interior walls, which form the several compartments. It is also of importance that there be some means of locking the sections to prevent any lateral or vertical displacement of them, which would tend to destroy the coincidence of the several sections.

The object of my invention, therefore, is to provide a tile for electric conduits, so constructed as to insure a close joint between and a perfect coincidence of the ends of its outer and inner walls with the ends of the outer and inner walls of the preceding and succeeding tile or sections, and at the same time to provide a means of locking the sections against lateral or vertical displacement.

To these ends my invention consists, generally stated, in tubular sectional tiles for electric conduits, having longitudinal partition-walls extending through the same and terminating at the ends of the tiles, the ends of said tiles having a series of tongues and grooves formed in their outer walls and arranged at angles to each other and adapted to bring the outer walls and the inner partition-walls of the tiles composing the conduit into exact coincidence and lock them in such position against lateral and vertical displacement.

To enable others skilled in the art to make and use my invention, I will describe the same more fully, referring to the accompanying drawings, in which—

Figure 2:
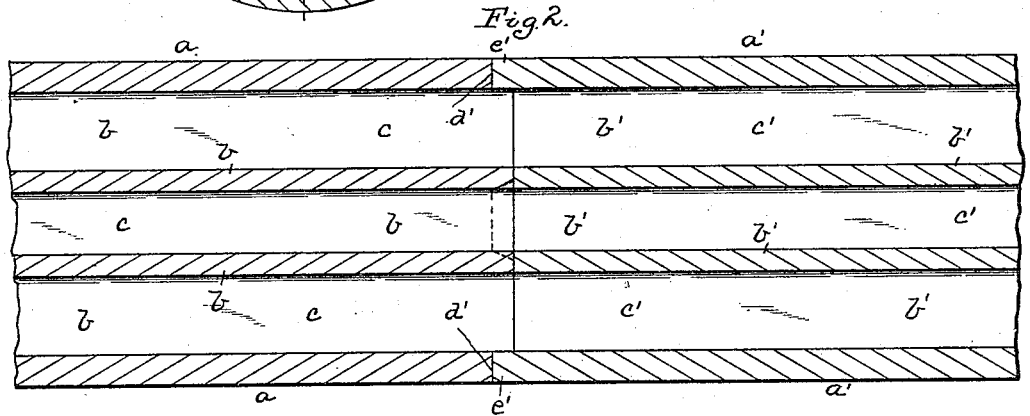
Figure 3:
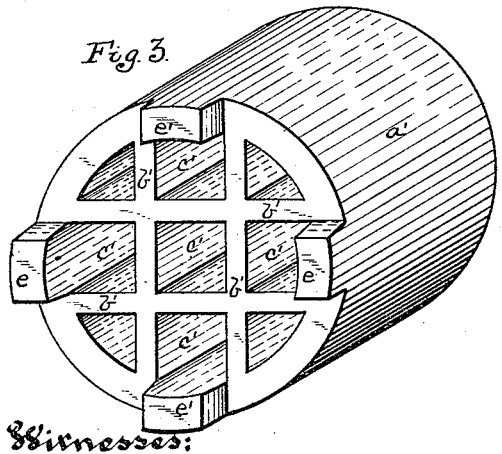
Figure 4:
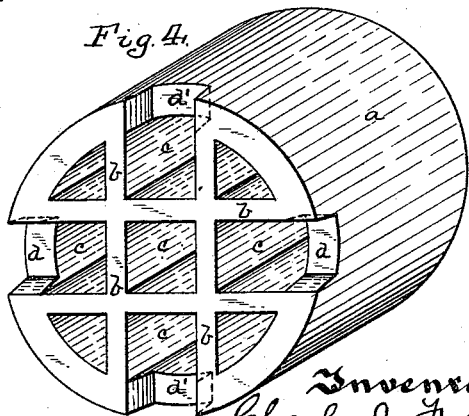

Figure 1 is a perspective view of the end of two sections of my improved conduit. Fig. 2 is a vertical section thereof, and Figs. 3 and 4 are perspective views of the ends, showing the lock devices.

Like letters indicate like parts in each.

I have illustrated my invention in connection with a conduit circular in form, although it may be applied to any other suitable form. The tubular tiles $a\ a'$ are formed in the usual manner of fire-clay, properly burned, and are provided with the interior longitudinal partition-walls $b\ b'$, which form the compartments $c\ c'$, respectively. The interior walls $b$ of the tiles $a$ are adapted to coincide with the interior walls $b'$ of the tiles $a'$ when the two tiles are properly joined, as will more fully appear. The outer walls of the tiles $a$ are provided with the grooves $d\ d'$, formed in the ends of said tiles $a$, while the tiles $a'$ are provided with the tongues $e\ e'$, corresponding to the grooves $d\ d'$ and adapted to enter said grooves. The grooves $d\ d'$ and the tongues $e\ e'$ are arranged at an angle to one another, so that when the two tiles are joined the tongues and grooves $d$ and $e$ will lock the tiles against any lateral displacement, while the grooves $d'$ and tongues $e'$ will prevent the tiles from vertical displacement.

In laying an electric conduit composed of tile constructed as above described the tile $a$ is first laid horizontally in a suitable trench dug to receive it, when the tile $a'$ is connected thereto, the tongues $e\ e'$ of said tile $a'$ serving to guide the section $a'$ to place, so that when the said tongues $e\ e'$ enter the corresponding grooves $d\ d'$ of the tile $a$ the outer walls of said tiles $a\ a'$ and the interior partition-walls $b\ b'$ will exactly coincide, their ends being in contact with each other, thereby bringing the compartments $c\ c'$ into perfect alignment with each other. In this manner continuous and even passages are formed from one end of the line to the other, so that the wires may be readily drawn through their allotted compartments without interference due to any unevenness or abutments within the several compartments. The tongues $e'$, fitting in the grooves $d'$, prevent any vertical displacement which might be caused by the weight of earth or for any other cause, while the tongues $e$ and the grooves $d$ lock the sections against any lateral displacement, and in the same manner the several partition-walls within the tiles bear against each other and form smooth joints between said walls and a continuous and even course through the compartments of the conduit.

What I claim as my invention, and desire to secure by Letters Patent, is—

A conduit for electric wires, formed of a series of tubular sectional tiles having longitudinal partition-walls extending through the same, the ends of the outer walls of said tiles having tongues and grooves formed within their walls and arranged at angles to one another and adapted to bring the outer walls and inner partition-walls of each tile into coincidence with its counterpart and to lock it against lateral or vertical displacement, substantially as set forth.

In testimony whereof I, the said CHARLES A. FREEMAN, have hereunto set my hand.

CHARLES A. FREEMAN.

Witnesses:
ROBT. D. TOTTEN,
J. N. COOKE.